US007219082B2

(12) United States Patent
Forte

(10) Patent No.: US 7,219,082 B2
(45) Date of Patent: May 15, 2007

(54) FINANCIAL MANAGEMENT SYSTEM

(76) Inventor: Patrick Forte, 5034 Overlook Rd. NW., Washington, DC (US) 20016

( * ) Notice: Subject to any disclaimer, the term of this patent is extended or adjusted under 35 U.S.C. 154(b) by 0 days.

(21) Appl. No.: 11/228,267

(22) Filed: Sep. 19, 2005

(65) Prior Publication Data
US 2006/0064368 A1 Mar. 23, 2006

(51) Int. Cl.
*G06F 17/60* (2006.01)
(52) U.S. Cl. ............... 705/39; 705/40; 705/41; 705/42; 705/43; 380/3; 380/4; 380/21; 380/22; 380/24; 380/35; 380/38; 380/44; 380/45; 380/51
(58) Field of Classification Search ............ 705/35, 705/42, 39–41; 380/21, 24
See application file for complete search history.

(56) References Cited
U.S. PATENT DOCUMENTS

| | | | | |
|---|---|---|---|---|
| 5,544,246 A | * | 8/1996 | Mandelbaum et al. | ........ 705/65 |
| 5,544,256 A | | 8/1996 | Mandelbaum et al. | |
| 5,578,808 A | * | 11/1996 | Taylor | ........... 705/41 |
| 5,873,072 A | | 2/1999 | Kight et al. | |
| 5,907,832 A | * | 5/1999 | Pieterse et al. | ............... 705/39 |
| 6,122,625 A | | 9/2000 | Rosen | |
| 6,282,522 B1 | * | 8/2001 | Davis et al. | ............ 705/41 |
| 6,317,745 B1 | | 11/2001 | Thomas et al. | |
| 6,473,500 B1 | * | 10/2002 | Risafi et al. | ........... 379/144.01 |
| 6,529,880 B1 | * | 3/2003 | McKeen et al. | ............... 705/17 |
| 6,594,647 B1 | * | 7/2003 | Randle et al. | ................ 705/77 |

FOREIGN PATENT DOCUMENTS

| | | | |
|---|---|---|---|
| JP | 11066168 A | * | 8/1997 |
| JP | 11066168 A | | 3/1999 |

OTHER PUBLICATIONS

Point-of-Sale networks make their move. (includes related article on electronic benefit transfer), (O'Heney, Sheila; Computers in Banking, vol. 7, No. (, p. 32(7), Sep. 1990).*

* cited by examiner

*Primary Examiner*—Andrew J. Fischer
*Assistant Examiner*—Cristina Owen Sherr
(74) *Attorney, Agent, or Firm*—Sughrue Mion, PLLC

(57) ABSTRACT

A financial transaction network includes a customer network serviced by a host processor. The financial transaction network provides customers with a plurality of diverse and interchangeable financial products and financial services that customers may utilize to directly manage their financial assets. The host processor acts as a communications switch validating incoming transaction requests and routing them to specialized subsystems. The host processor maintains central records that can be accessed by network participants. The financial transaction network enables customers to continually interchange account values relating to any financial product, or financial service within the network. With its accessibility, speed and finality of settlement, the network permits these interchanges to be accomplished with maximum efficiency.

17 Claims, 3 Drawing Sheets

FINANCIAL MANAGEMENT SYSTEM

BACKGROUND OF THE INVENTION

This invention relates to financial systems and to the management of assets by individual consumers. This system provides individual consumers with access to their financial assets 24 hours a day with speed and flexibility from hundreds of locations. The invention enables customers to immediately convert a selected portion of their financial assets into different forms of assets.

The contemporary typical consumer practice to maintain assets is by maintenance of bank checking accounts, separate credit card accounts, and unconnected store credit, debit and charge accounts in order to pay for purchases made and make payments for financial and other products and services. Although this current system is profitable for traditional banks, and credit card associations, in terms of transaction fees and interest collected, this fragmentation of mechanisms for managing personal financial assets is cumbersome and costly for consumers, retailers and other parties to financial payment transactions. Given recently developed hardware and software technology, sophisticated data processing services, secure access and identification technology and one or more FDIC-insured Banks ("Bank"), it is feasible to provide customers with a menu of financial and payment services through an integrated service provider and a single host processor.

SUMMARY OF THE INVENTION

Given these problems, it is the object of this invention to provide an integrated and seamless system for individuals to directly manage their financial assets.

A further object of this invention is to enable an individual as a customer to convert paychecks and other negotiable instruments into a balance in a stored value account ("SVA"), which is a nonbank credit account maintained by a merchant for the customer. The credit balance in the SVA can be utilized by the consumer to make purchases of goods or services (including financial products or financial services) from the merchant without using a traditional credit card or cashing a personal check or third party payroll check. With this account, the customer may pay for purchases, receive cash, or may instruct the merchant to transfer account values from the merchant's demand deposit account ("DDA") at a Bank, to the customer's DDA at a Bank.

A further object of this invention is to provide a financial transactions network, the essential components of which include:

[1] A merchant with a sizeable existing or potential customer base.

[2] A host processing system to manage the customer's financial transactions occurring within the financial transaction network.

[3] A set of data processing subsystems to implement various financial transactions as instructed by the customer.

[4] A secure, durable and reusable customer access device, such as a card, ("Access Device") to safeguard customers' transactions and account balances.

[5] A Bank, which will maintain DDAs and other Bank accounts for customers, the merchant, and other participants in the Program Account ("PA").

An object of this invention is to define this new transaction mechanism constructed around the PA. The PA is a financial transactions network that provides customers, by means of a host processor, with access to basic financial services and to a broad array of other financial products and financial services.

These and other objects of the invention are achieved by having the customer enroll in the PA, a central component of which is an Individual Program Account ("IPA"). The IPA is an individual customers account representing an array of activities that have been individually selected by the customer from the totality of the activities in the PA. In opening an IPA, the customer performs the following steps, not necessarily in this order:

[1] Opens an SVA

[2] Receives an Access Device, and

[3] Opens a DDA at a Bank.

Given this basic architecture, customers may utilize their IPAs to perform a variety of financial functions. For example:

A. The customer uses the value in his SVA as consideration for a transfer of funds by the merchant from the merchant's DDA a Bank to the customer's DDA in a Bank.

B. The customer's paycheck or other negotiable instrument is presented for verification or guarantee at the merchant's point of sale ("POS") terminal. If the item is accepted, the merchant, utilizing access to the host processor, credits the value of the customer's paycheck or other negotiable instrument to the customer's SVA. As a part of the transaction, the paycheck is deposited in the merchant's DDA account at a Bank.

As authorized by the customer, the cost of goods and services purchased from the merchant is deducted by the host processor from the customer's SVA.

C. The customer may also receive cash at the merchant's POS terminal, the value of which is debited from his SVA.

D. At the customer's direction, the merchant transfers account values, in a prearranged or other amount, from the merchant's DDA account at a Bank to the customer's DDA account at a Bank.

E. Customers may instruct the host processor, for example by telephone, personal computer, or by a device located in a kiosk, to make transfers of value from one of their IPA accounts to another IPA account.

These and other aspects of this invention will be described in greater detail by reference to the attached drawing and the description of the preferred embodiment as follows.

DESCRIPTION OF THE PREFERRED EMBODIMENT

Figure 1:
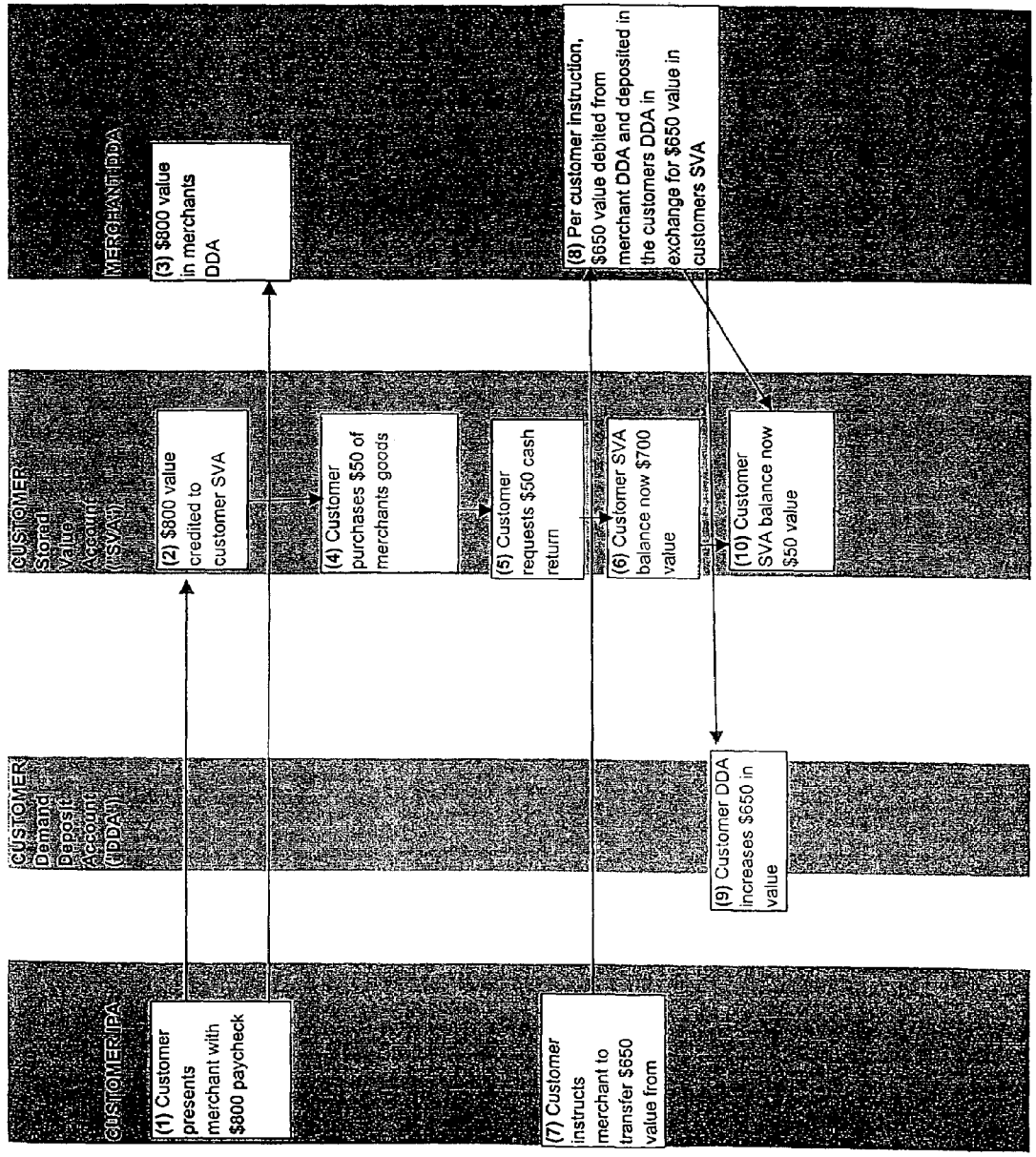
FIG. 1 is a flow chart of the basic architectural aspects of this invention and a flow of various transactions.
Figure 2:
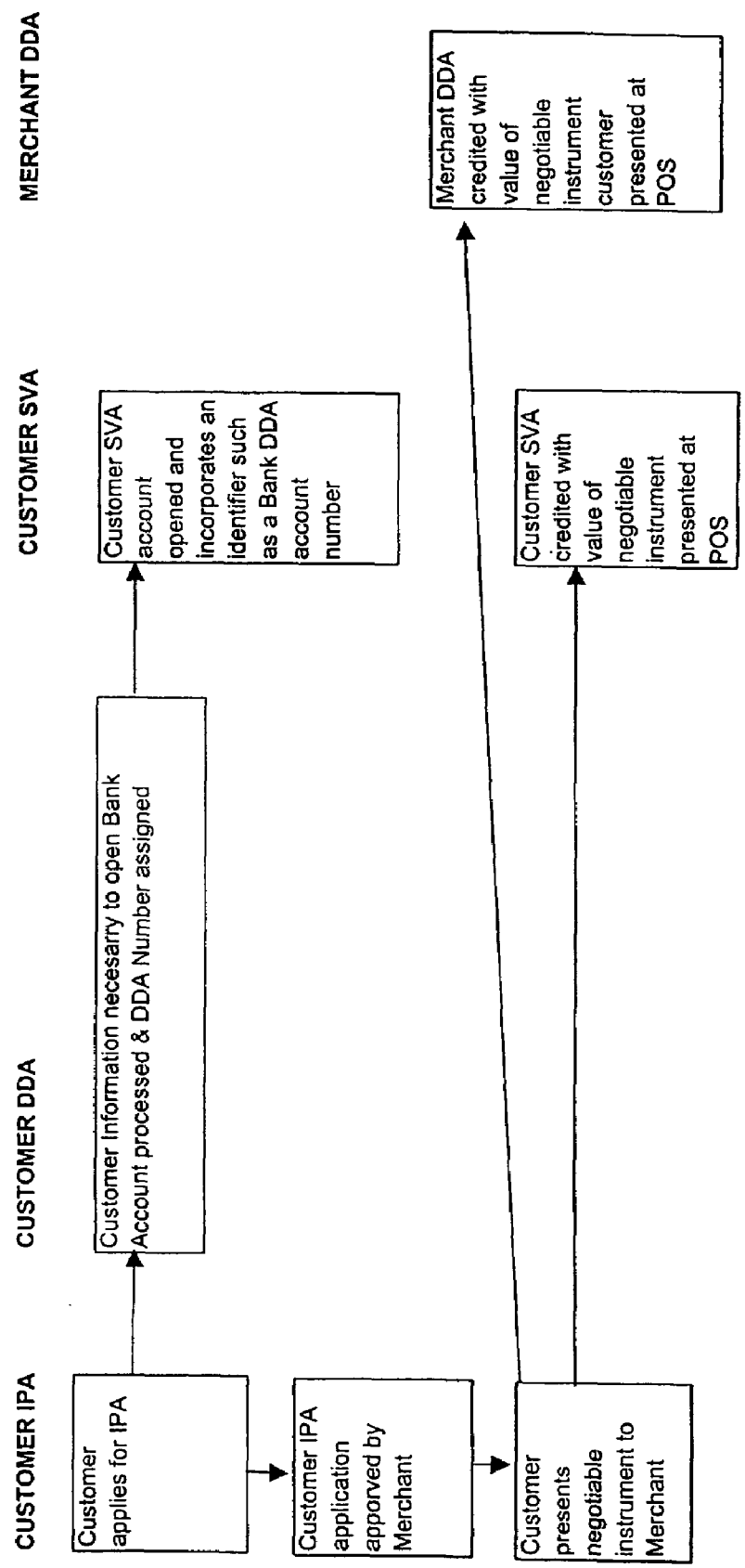
FIG. 2 is a flow chart illustrating setup transactions for a Program Account.
Figure 3:
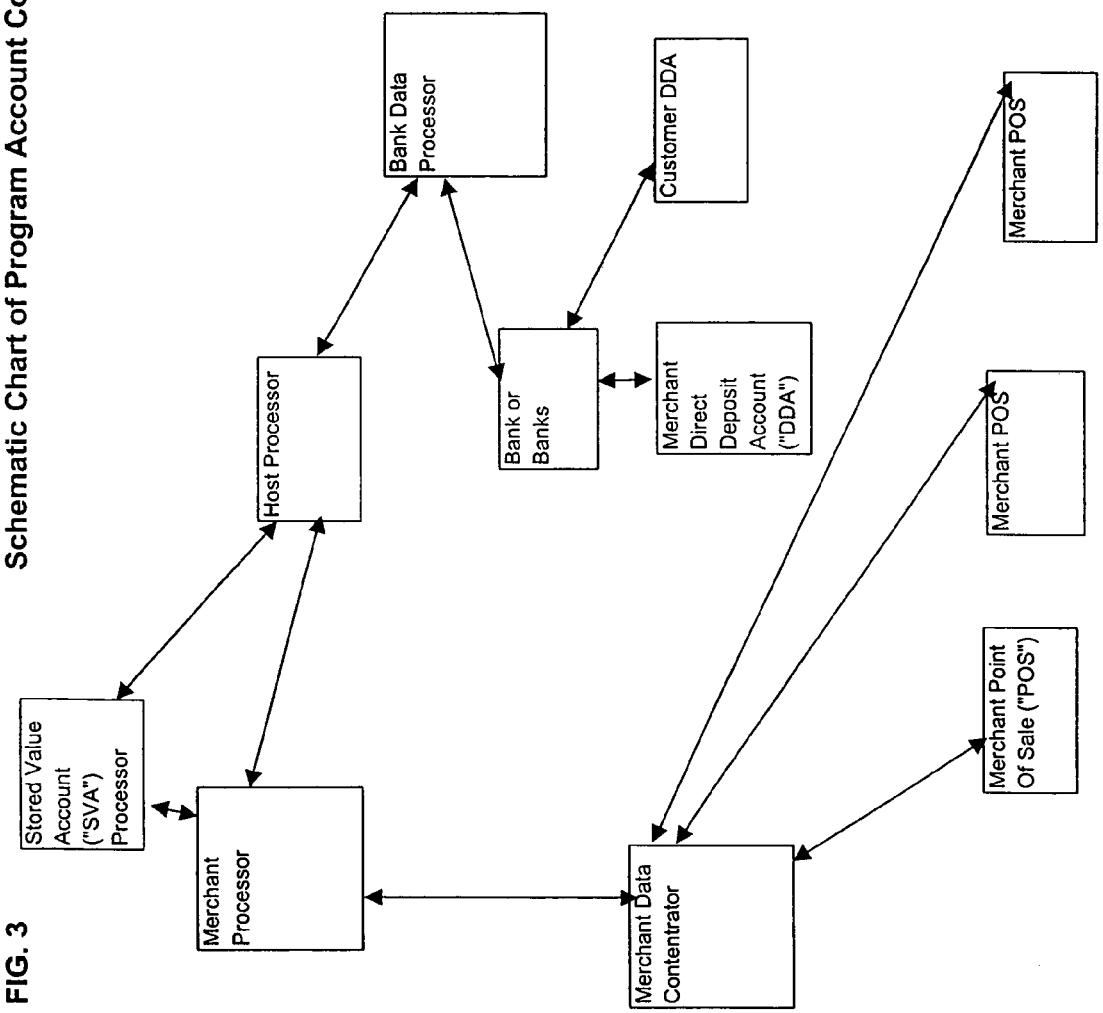
FIG. 3 is a schematic chart of Program Account components.

Referring now to FIGS. 1, 2, and 3, the basic architectural aspects and relationships of this financial transactions network are depicted. Access to the financial transactions network is achieved through Merchant point of sale ("POS") terminals depicted in FIG. 3. As will be appreciated, these are terminals, typically located at check-out locations at the merchant stores. This system can accommodate any number of POS locations, limited only by host processor capability. Dedicated software featuring a menu-driven system with multiple levels of security, formatted screens for data input, and local editing capability is provided for each POS. The ability to format and transmit instructions, receive confirmations from the host processor and make inquiries to a customer's accounts is provided from the POS. The specific aspects of programming such terminals are well within the state of the art, typified by the sophistication of current ATM technology. The POS terminals are utilized to establish credit balances in the customer's Individual Program Account ("IPA"). These IPAs include, but are not limited to, stored value accounts and demand deposit accounts ("DDAs").

The Figures show the interrelationship among the basic elements of the financial transactions network, or, the Program Account system:

1. The customer's Individual Program Account ("IPA").
2. The customer's Stored Value Account ("SVA").
3. The Bank.
4. The customer's Demand Deposit Account ("DDA") and other accounts at a Bank.
5. The Merchant's DDA and other accounts at a Bank.
6. The host processor.

The IPA provides customers with access to basic banking services and to a broad array of other financial products and financial services. The customer enrolls in the PA by completing a comprehensive application that lists the financial products and financial services offered by the PA. As they complete the application, customers chose the financial products and financial services they wish to include in their IPA. Thus, an IPA is unique to that particular customer. IPA services are accessed by an Access Device, such as a card, that the participant receives upon enrollment in the Program. It will be apparent that other secured access means are known without requiring the use of physical devices such as security cards, locks, PIN's and the like. Communication by the customer with the financial transaction network is established, for example, from the POS terminals, kiosks on Merchant's premises, as well as by personal computer, telephone, mail and direct deposit.

The SVA is an account in the customer's name entered on the books of the Merchant. Customers may utilize the credit balance in this account for the following exemplary uses:

a. purchase goods and services from the Merchant;
b. purchase financial products and financial services; and
c. instruct the Merchant to credit the customer's account at a Bank with funds belonging to the Merchant.
d. convert value from a customers' DDA to their SVA.

All Banks are FDIC-insured depository institutions. The Merchant maintains a DDA and other accounts at a Bank. The Merchant's customers who have IPAs maintain DDA and other accounts at a Bank.

DDAs are deposits from which funds may be withdrawn "on demand" by order of the account holder ("customer") to make payments to third parties, for deposit in the customer's other accounts, or to meet the customer's own needs for cash. Methods of withdrawal of funds from DDAs include paper check (including electronic truncation), electronic check, automatic teller machine ("ATM") cards, debit card, pre-authorized debit, and telephone transfer.

The financial transaction network (the Program Account system) allows customers to directly manage their financial assets by interchanging account credits among all financial products or financial services within the network in which the customer has elected to participate. The hub of this network is the host processor illustrated in FIG. 3.

The host processor has the following functions:

a. invokes security routines to ensure authorized access to the financial transactions network and acts to validate, accept or reject, and route all transactions to their appropriate destinations;
b. maintains, and makes available to customers, account information; confirmations and status messages;
c. posts debits and credits to customers' SVAs resulting from transactions by customers at the Merchant's POS terminals;
d. enables customers to interchange values among accounts in their IPA by posting debits and credits to all accounts in customers' IPAs as required by customer transactions;
e. enables customers to utilize credits in their SVAs to instruct the Merchant to credit the customer's DDA at a Bank with funds belonging to the Merchant; and
f. enables customers to convert their paycheck into immediate credits in their SVA, with immediate deductions from the SVA for goods purchased and for the return of cash to the customer.

The basic types of transactions that are allowed in the financial transaction network and each of the flows throughout the system will be discussed in more detail. It will be appreciated that these are examples of the capability of the system and are not limiting as to its complete capability. The basic banking services component of the IPA allows customers to hold their funds in an FDIC-insured checking or savings account, or both, at a Bank.

Once enrolled in the PA, customers may fund their Bank accounts with, for example, direct deposit of paychecks, government benefits payments, deposits by mail, and by conversion from the stored value element of their IPA. The IPA also permits customers to utilize their paychecks at a point of sale ("POS") terminal to credit their SVA. During this transaction, from the SVA, the customer may pay for goods purchased at the Merchant, and cash received. Pursuant to the IPA agreement, the customer may have the Merchant convert a portion of the balance remaining in their SVA after a specified period to their account at a Bank. This "POS paycheck transaction" is described in greater detail below.

One of the features of the IPA is the flexibility it provides for persons who wish to utilize the value of their paychecks at Merchant POS terminals. This feature is called a POS Paycheck Processing Transaction. Following is an example of how this transaction is processed by reference to FIG. 1 and the steps depicted using the identification of the respective boxes in that figure.

[1] Paycheck presented. The customer gives his paycheck ($800 in this example) to an employee at a POS terminal.

[2] Paycheck accepted. At this step the merchant verifies or guarantees the paycheck. If the paycheck is acceptable to Merchant, the transaction results in a credit of $800 to Merchant's DDA account at a Bank.

[3] Simultaneously, a credit of $800 is made to the customer's SVA.

[4] Goods purchased. Instead of using cash, charging to credit card or the like, the value of goods selected by the customer ($50 in this example) is debited from the SVA of the customer's IPA and credited to Merchant. After this transaction, there is $750 remaining in the SVA element of the customer's IPA.

[5] Cash disbursed. As a part of this transaction, the customer may also request cash at the POS, $50 in this example.

[6] The customer SVA is debited for the transactions and the remaining balance in the customer's SVA is $700.

[7] Stored value converted. Pursuant to the customer's instruction contained in the PA agreement.

[8] Merchant will convert a portion of the stored value element of the customer's SVA into his DDA Bank account.

[9] The value of the customer's DDA increases based on the transfer.

[10] The value of the customer's SVA decreases based on the transfer.

Referring to FIG. 2, the flow to setup the system for transactions is illustrated. Four different transaction sources exist:

a. Customer IPA
b. Customer DDA
c. Customer SVA
d. Merchant DDA

To open an IPA, the customer completes a Program Account application. The information in this application is forwarded to the merchant site for approval. Upon merchant approval of the PA application, this data is forwarded to a Bank to open the customer's DDA. Thereafter, the merchant creates an SVA for the customer.

After the IPA is opened, customer's SVA transactions are processed and settled by the merchant. Customers' and merchant's DDA transactions are cleared and settled by a Bank, or its servicer. Instructions by customers relating to transfers between their SVAs and DDAs, among other transactions, are processed by the host processor.

Thereafter, the customer may present negotiable instruments, such as payroll checks to the Merchant to be processed within the customer's IPA.

The establishment of the customer SVA allows that account to be credited with the amount of a negotiable instrument at the point of sale. Additionally, as illustrated in FIG. 1, the merchant DDA is initially credited with the total value of the customer negotiable instrument presented at the time of sale. By these techniques, the total value of the negotiable instrument may be credited to the merchant DDA while simultaneously a corresponding credit balance is established in the customer's SVA. This is accomplished without first requiring a deposit into a bank account.

FIG. 3 explains in a schematic form the flow of data from various points using the host processor as a hub. The chain from the customer DDA through a Bank to the host processor allows a plurality of merchant POS locations to access data from the customer's IPA.

It is apparent that modifications and variations of this system may be practiced without departing from the scope of this invention. For example, while this invention deals with bank functions, that term is used to the fullest definition and scope and includes accounts in all-federally-insured depository institutions. Moreover, while the negotiable instruments would normally be construed to be checks, both personal and third party, in accordance with this invention such could also include, stocks and bonds pledged or assigned for sale.

Another modification within the scope of this invention includes the elimination of the customer DDA. Here the customer would establish a SVA and the proceeds would be deposited in the merchant's DDA and the customer does not have an associated DDA. Customer access is limited to the SVA balance. An option would allow disbursing cash from the merchant DDA, using established networks.

I claim:

1. A financial transaction network for facilitating direct management of financial assets for customers each having individual program accounts, comprising:

means allowing a plurality of customers to access their individual program accounts, the individual program account being an account representing an array of accounts that have been individually selected by the customer from the totality of the accounts and including at least one stored value account for each customer ("SVA", which is a non-bank account maintained by a merchant for the customer), and at least a bank demand deposit account, a host processor having a database for maintaining individual program account transactions and records, means for establishing and maintaining a plurality of customer individual program accounts and, means enabling a plurality of customers to individually utilize the value in the individual customer's stored value account and instruct the merchant to credit the customer's demand deposit account at a bank with funds from a merchant's demand deposit account.

2. The financial transaction network of claim 1 further comprising, means to support a plurality of stored value accounts maintained by a merchant for a plurality of customers each having an individual program account.

3. The financial transaction network of claim 1 further comprising, means to support a plurality of demand deposit accounts maintained by a plurality customers in a federally-insured banks as a component of an individual program account.

4. The financial transaction network of claim 2 further comprising, means to support, at a merchant locations, a plurality of point of sale terminals by which a customer may convert the value of a negotiable instrument to a customer's stored value account maintained by that merchant.

5. The financial transaction network of claim 1 further comprising, means by which a customer may convert value from one account in their individual program account to another account in the same individual program account.

6. The financial transaction network of claim 2 further comprising, means enabling said merchant to utilize point of sale terminals to access services to verify a check presented by a customer to the merchant.

7. The financial transaction network of claim 4 further comprising, means enabling said merchant to credit to a customer's stored value account by an amount based on the value of a negotiable instrument presented to the merchant by the customer.

8. The financial transaction network of claim 2 further comprising means enabling a customer to access their stored value account to credit or debit other accounts in their individual program account.

9. The financial transaction network of claim 2 further comprising means enabling a customer to utilize the value in the customer's stored value account and instruct the merchant to credit the customer's demand deposit account at a bank with funds from said merchant's demand deposit account.

10. A method of consumer transaction comprising the steps of:

establishing a customer demand deposit account, establishing a customer individual program account which includes at least one customer stored value account, establishing a merchant stored value account ("SVA", which is a non-bank account maintained by a merchant for the customer), and executing a transaction between said consumer and said merchant affecting the account balances in said customer stored value account and said customer demand deposit account.

11. The method of claim 10 further comprising the step of: pre-approving withdrawals from either a customer stored value account or a customer demand deposit account.

12. The method of claim 10 further comprising, the step of establishing accounts within said individual program account.

13. The method of claim 10 wherein said step of executing a transaction comprises the step of presenting a negotiable instrument at a point of sale at said merchant, to credit or debit account balances.

14. The method of claim 11 further comprising the step of providing customer access to the customer demand deposit account and said customer individual program account accounts to convert balances from one account to another account.

15. The method of claim 11 further comprising, the steps of establishing a merchant demand deposit account and providing merchant access to the merchant stored value account to convert a balance to said customer demand deposit account.

16. The method of claim 12 further comprising, the step of converting a balance from said merchant demand deposit account to said customer demand deposit account.

17. The method of claim 10 further comprising, the steps of said customer presenting a negotiable instrument at a point of sale at said merchant, acceptance of the negotiable instrument by the merchant, crediting a corresponding value corresponding to the negotiable instrument to the customer stored value account and paying for the purchase of goods from said merchant.

* * * * *

UNITED STATES PATENT AND TRADEMARK OFFICE
CERTIFICATE OF CORRECTION

PATENT NO. : 7,219,082 B2  Page 1 of 1
APPLICATION NO. : 11/228267
DATED : May 15, 2007
INVENTOR(S) : Patrick Forte It is certified that error appears in the above-identified patent and that said Letters Patent is hereby corrected as shown below:

On the Title Page, please add the following:

Related U.S. Application Data - should read

Item (63) Continuation of Application No. 09/644,560 filed on August 24, 2000, now USP 6,970,843.

Signed and Sealed this

Twelfth Day of August, 2008

JON W. DUDAS
*Director of the United States Patent and Trademark Office*